United States Patent
Holzer et al.

(10) Patent No.: US 11,044,464 B2
(45) Date of Patent: Jun. 22, 2021

(54) DYNAMIC CONTENT MODIFICATION OF IMAGE AND VIDEO BASED MULTI-VIEW INTERACTIVE DIGITAL MEDIA REPRESENTATIONS

(71) Applicant: Fyusion, Inc., San Francisco, CA (US)

(72) Inventors: Stefan Johannes Josef Holzer, San Mateo, CA (US); Stephen David Miller, Menlo Park, CA (US); Pantelis Kalogiros, San Francisco, CA (US); George Haber, Los Altos Hills, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 114 days.

(21) Appl. No.: 15/607,334

(22) Filed: May 26, 2017

(65) Prior Publication Data
US 2018/0227569 A1 Aug. 9, 2018

Related U.S. Application Data

(60) Provisional application No. 62/457,140, filed on Feb. 9, 2017.

(51) Int. Cl.
*H04N 13/00* (2018.01)
*H04N 13/395* (2018.01)
(Continued)

(52) U.S. Cl.
CPC ......... *H04N 13/395* (2018.05); *G06F 1/1694* (2013.01); *G06F 3/04845* (2013.01);
(Continued)

(58) Field of Classification Search
CPC .... H04N 13/395; H04N 13/117; H04N 5/247; G06F 3/0346; G06F 17/30294;
(Continued)

(56) References Cited

U.S. PATENT DOCUMENTS

| | | |
|---|---|---|
| 5,926,190 A | 7/1999 | Turkowski et al. |
| 6,252,974 B1 | 6/2001 | Martens et al. |

(Continued)

*Primary Examiner* — Jayanti K Patel
*Assistant Examiner* — Richard B Carter
(74) *Attorney, Agent, or Firm* — Kwan & Olynick LLP

(57) ABSTRACT

Various embodiments disclosed herein relate to systems and methods for analyzing and manipulating images and video. Methods as disclosed herein may include retrieving, using a processor, a multi-view interactive digital media representation (MIDMR) from a storage location, the MIDMR including a content model and a context model, the content model characterizing an object, and the context model characterizing scenery surrounding the object. The methods may also include receiving, using the processor, at least one dynamic content input associated with the retrieved MIDMR, the dynamic content input being received while a user is interacting with the MIDMR. The methods may further include implementing, using the processor, one or more modifications associated with the MIDMR based, at least in part, on the received at least one dynamic content input, the one or more modifications modifying a presentation and functionality of the MIDMR.

20 Claims, 15 Drawing Sheets

(51) Int. Cl.
  *H04N 13/117*   (2018.01)
  *G06F 16/21*    (2019.01)
  *G06F 1/16*     (2006.01)
  *H04N 5/247*    (2006.01)
  *G06F 3/0484*   (2013.01)

(52) U.S. Cl.
  CPC ........... *G06F 16/212* (2019.01); *H04N 5/247* (2013.01); *H04N 13/117* (2018.05)

(58) Field of Classification Search
  CPC .. G06F 16/212; G06F 1/1694; G06F 3/04845; G09G 3/003
  USPC ................. 348/42; 345/20, 427; 382/154
  See application file for complete search history.

(56) References Cited

U.S. PATENT DOCUMENTS

| | | | |
|---|---|---|---|
| 8,078,004 B2 | 12/2011 | Kang et al. | |
| 2002/0094125 A1 | 7/2002 | Guo | |
| 2006/0188147 A1 | 8/2006 | Rai et al. | |
| 2007/0296721 A1* | 12/2007 | Chang | H04N 13/359 345/427 |
| 2008/0106593 A1 | 5/2008 | Arfvidsson et al. | |
| 2008/0152258 A1 | 6/2008 | Tulkki | |
| 2008/0201734 A1 | 8/2008 | Lyon et al. | |
| 2008/0225132 A1 | 9/2008 | Inaguma | |
| 2008/0246759 A1 | 10/2008 | Summers | |
| 2009/0263045 A1 | 10/2009 | Szeliski et al. | |
| 2009/0303343 A1 | 12/2009 | Drimbarean et al. | |
| 2010/0033553 A1 | 2/2010 | Levy | |
| 2010/0171691 A1 | 7/2010 | Cook et al. | |
| 2011/0157169 A1* | 6/2011 | Bennett | H04N 13/00 345/419 |
| 2011/0254835 A1 | 10/2011 | Segal | |
| 2011/0261050 A1 | 10/2011 | Smolic et al. | |
| 2012/0019557 A1 | 1/2012 | Aronsson et al. | |
| 2012/0147224 A1 | 6/2012 | Takayama | |
| 2013/0155180 A1 | 6/2013 | Wantland et al. | |
| 2013/0162634 A1 | 6/2013 | Baik | |
| 2013/0250045 A1 | 9/2013 | Ki et al. | |
| 2014/0087877 A1 | 3/2014 | Krishnan | |
| 2014/0253436 A1 | 9/2014 | Petersen | |
| 2014/0307045 A1 | 10/2014 | Richardt et al. | |
| 2015/0130799 A1* | 5/2015 | Holzer | G06F 3/04842 345/420 |
| 2015/0130800 A1 | 5/2015 | Holzer et al. | |
| 2015/0130894 A1 | 5/2015 | Holzer et al. | |
| 2015/0134651 A1 | 5/2015 | Holzer et al. | |
| 2015/0138190 A1 | 5/2015 | Holzer et al. | |
| 2015/0339846 A1 | 11/2015 | Holzer et al. | |
| 2016/0133006 A1* | 5/2016 | Li | G06T 7/70 382/154 |
| 2017/0018054 A1 | 1/2017 | Holzer et al. | |
| 2017/0018055 A1 | 1/2017 | Holzer et al. | |
| 2017/0018056 A1 | 1/2017 | Holzer et al. | |
| 2017/0084001 A1* | 3/2017 | Holzer | G06T 11/60 |

* cited by examiner

Multi-View Interactive Digital Media Representation (MIDMR) Acquisition System
100

User Specified Target
102

2D Images
104

Location Information
106

Depth Images
108

Sensor Fusion
110

Content Modeling (3D)
112

Context Modeling (2D)
114

Enhancement Algorithm(s)
116

User Feedback for Acquisition
120

MIDMR
118

*FIG. 1*

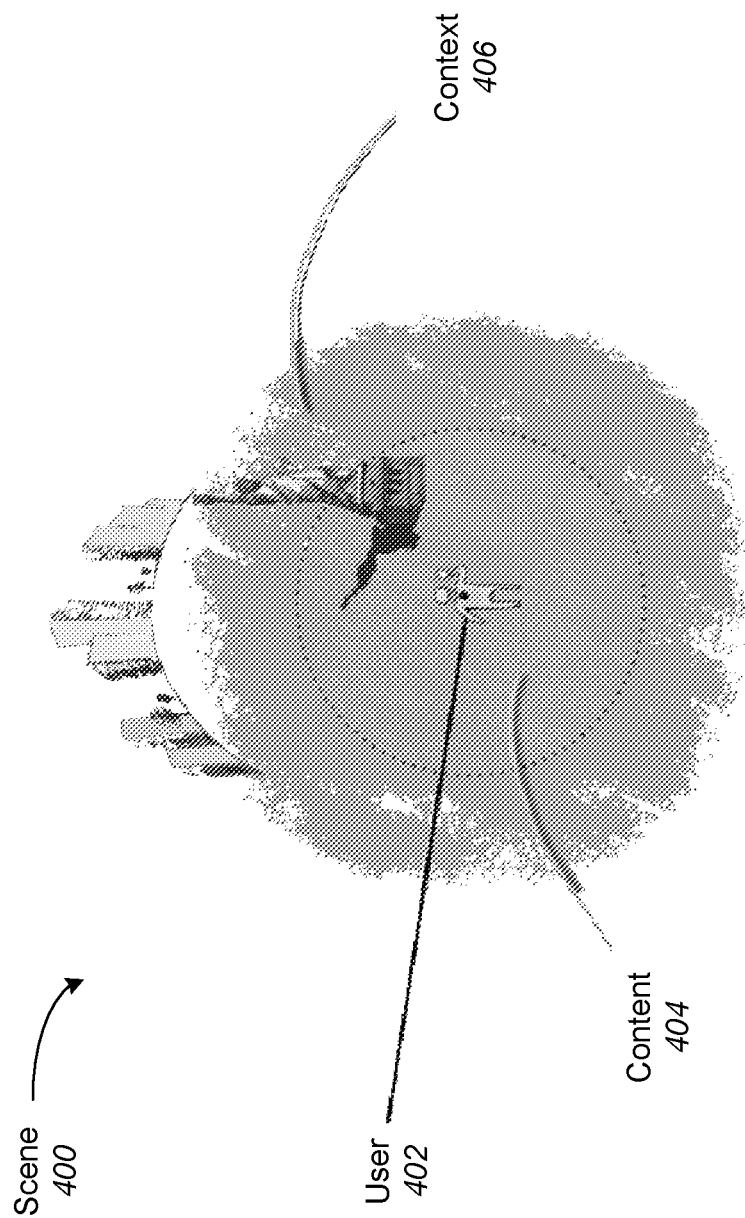

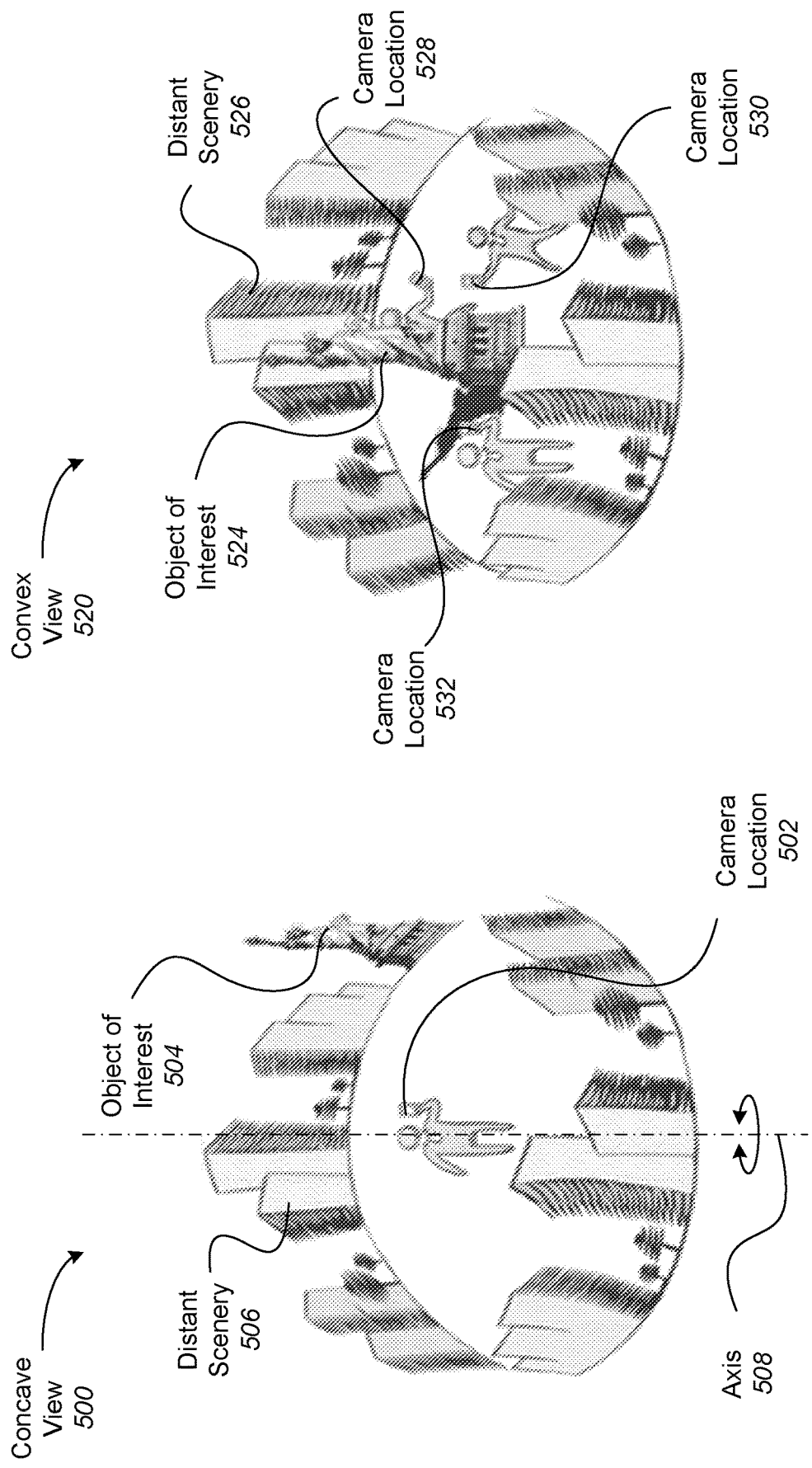

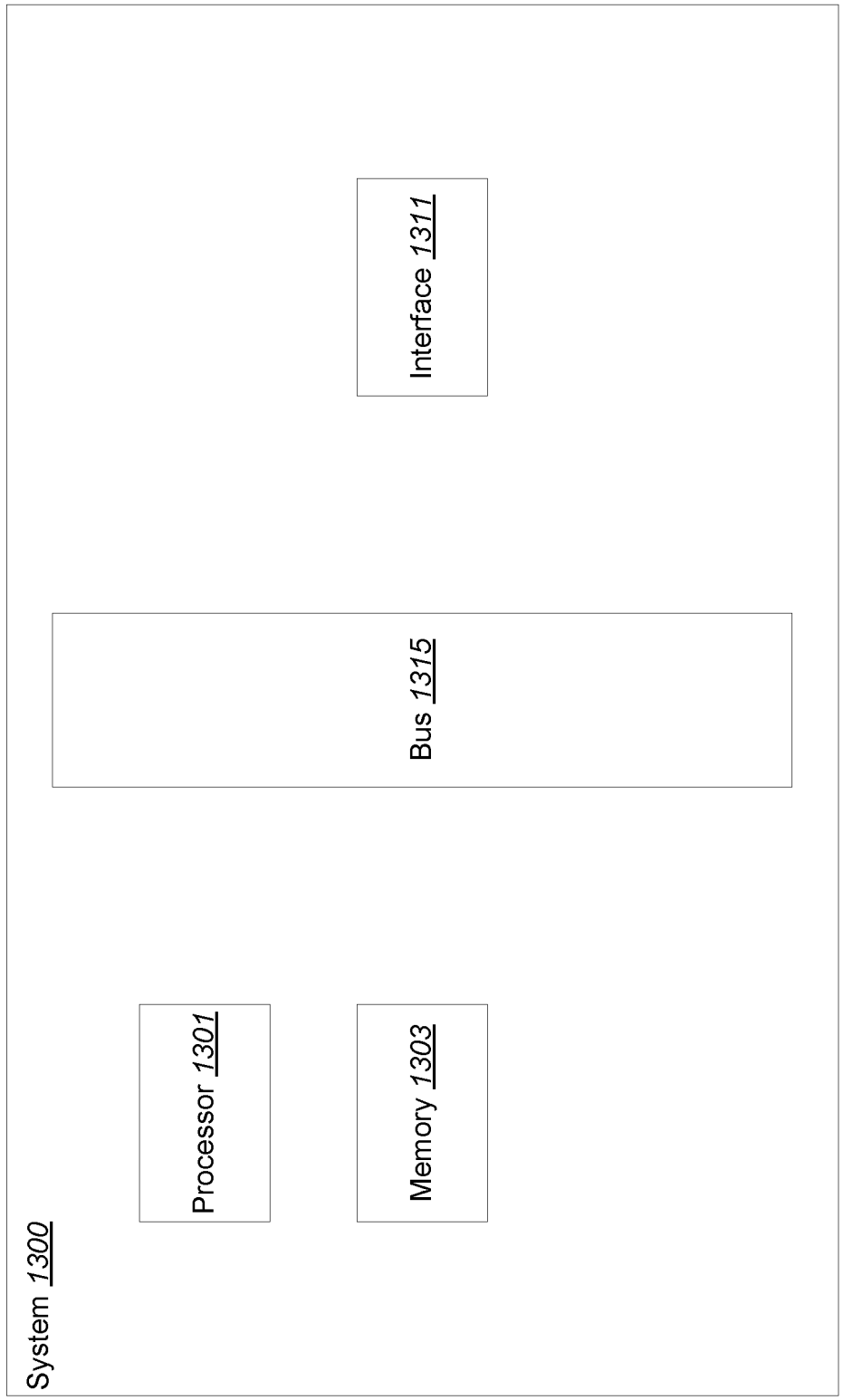

DYNAMIC CONTENT MODIFICATION OF IMAGE AND VIDEO BASED MULTI-VIEW INTERACTIVE DIGITAL MEDIA REPRESENTATIONS

CROSS-REFERENCE TO RELATED APPLICATIONS

This application claims the benefit under 35 U.S.C. § 119(e) of U.S. Provisional Patent Application No. 62/457,140, filed on Feb. 9, 2017, which is incorporated herein by reference in its entirety for all purposes.

TECHNICAL FIELD

The present disclosure relates to generating multi-view interactive digital media representations, which also includes providing a multi-view interactive digital media representation.

DESCRIPTION OF RELATED ART

Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity. Moreover, such 2D images are not able to provide high fidelity reproductions of memories and events while also implementing dynamic modifications to their presentation and user experience.

SUMMARY

Various embodiments of the present invention relate generally to systems and methods for analyzing and manipulating images and video. Methods as disclosed herein may include retrieving, using a processor, a multi-view interactive digital media representation (MIDMR) from a storage location, the MIDMR including a content model and a context model, where the content model characterizes an object, and where the context model characterizes scenery surrounding the object. The methods may also include receiving, using the processor, at least one dynamic content input associated with the retrieved MIDMR, where the dynamic content input is received while a user is interacting with the MIDMR. The methods may further include implementing, using the processor, one or more modifications associated with the MIDMR based, at least in part, on the received at least one dynamic content input, where the one or more modifications modify a presentation and functionality of the MIDMR.

In various embodiments, the dynamic content input is detected by one or more sensors of a mobile communications device. In some embodiments, the dynamic content input is a tilt detected and identified by at least one of an accelerometer or gyroscope of the mobile communications device. In various embodiments, the methods may further include identifying, using the processor, the one or more modifications based on the received at least one dynamic content input and dynamic content operation data. In some embodiments, the dynamic content operation data characterizes a mapping that identifies at least one dynamic content modification based on at least one dynamic content input. In various embodiments, the one or more modifications include modifying the content model included in the MIDMR.

According to some embodiments, the one or more modifications includes calling an application associated with the object. In various embodiments, the one or more modifications includes blocking a view of the object. In some embodiments, the content model and the context model are generated by fusing a plurality of images. In various embodiments, the content model is three dimensional, and the context model is two dimensional.

Systems are also disclosed herein that may include a communications interface configured to be coupled with a communications network. The systems may further include a processor configured to retrieve a MIDMR from a storage location, the MIDMR including a content model and a context model, the content model characterizing an object, and the context model characterizing scenery surrounding the object. The processor may be further configured to receive at least one dynamic content input associated with the retrieved MIDMR, the dynamic content input being received while a user is interacting with the MIDMR. The processor may also be configured to implement one or more modifications associated with the MIDMR based, at least in part, on the received at least one dynamic content input, the one or more modifications modifying a presentation and functionality of the MIDMR.

In various embodiments, the processor is further configured to identify the one or more modifications based on the received at least one dynamic content input and dynamic content operation data, where the dynamic content operation data characterizes a mapping that identifies at least one dynamic content modification based on at least one dynamic content input. In some embodiments, the one or more modifications includes modifying the content model included in the MIDMR. In various embodiments, the one or more modifications includes calling an application associated with the object. According to some embodiments, the content model and the context model are generated by fusing a plurality of images, and where the content model is three dimensional, and wherein the context model is two dimensional.

Further disclosed herein are computer readable media that may include computer code for retrieving a MIDMR from a storage location, the MIDMR including a content model and a context model, the content model characterizing an object, and the context model characterizing scenery surrounding the object. The computer readable media may further include computer code for receiving at least one dynamic content input associated with the retrieved MIDMR, the dynamic content input being received while a user is interacting with the MIDMR. The computer readable media may also include computer code for implementing one or more modifications associated with the MIDMR based, at least in part, on the received at least one dynamic content input, the one or more modifications modifying a presentation and functionality of the MIDMR.

In various embodiments, the computer readable media may also include computer code for identifying the one or more modifications based on the received at least one dynamic content input and dynamic content operation data, where the dynamic content operation data characterizes a mapping that identifies at least one dynamic content modification based on at least one dynamic content input. In some embodiments, the one or more modifications includes modifying the content model included in the MIDMR. According to various embodiments, the one or more modifications includes calling an application associated with the object. In some embodiments, the content model and the context model are generated by fusing a plurality of images, and where the content model is three dimensional, and wherein the context model is two dimensional.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates an example of a multi-view interactive digital media representation acquisition system.

FIG. 4 illustrates one example of separation of content and context in a multi-view interactive digital media representation.

FIGS. 5A-5B illustrate examples of concave view and convex views, respectively, where both views use a back-camera capture style.

FIG. 13 illustrates a particular example of a computer system that can be used with various embodiments of the present invention.

DETAILED DESCRIPTION

Figure 2:
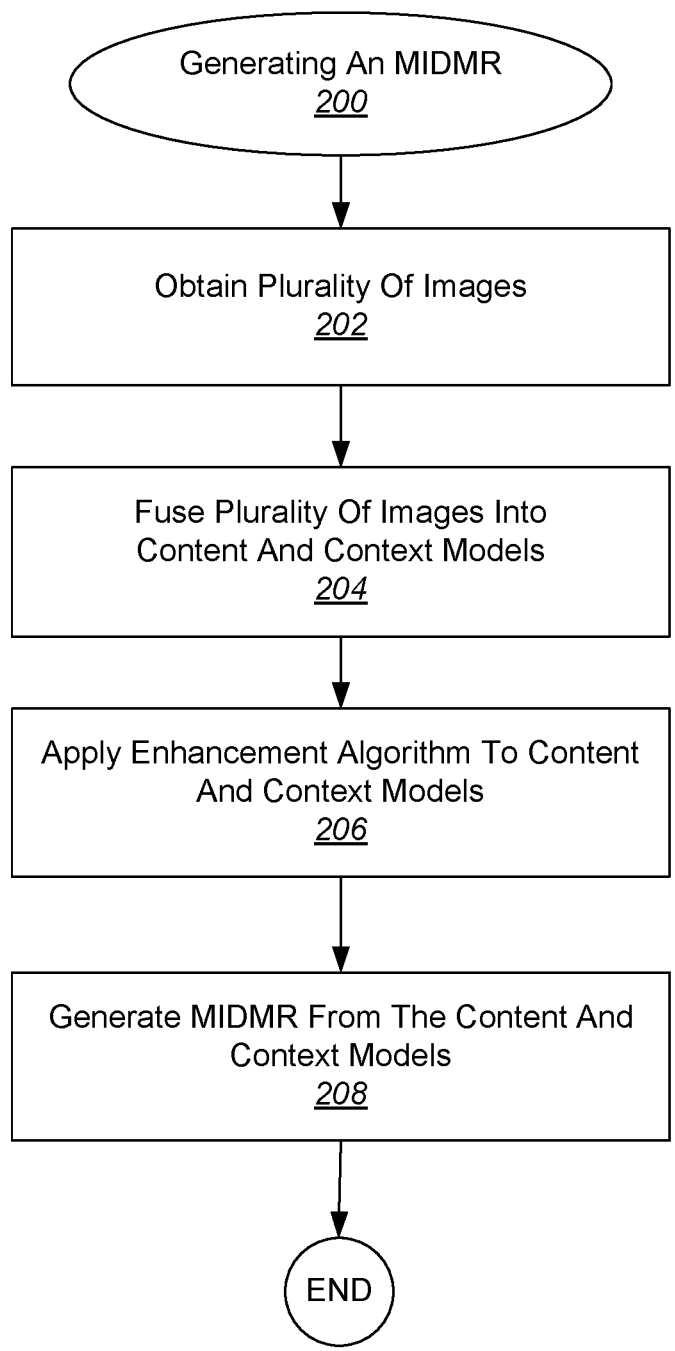
FIG. 2 illustrates an example of a process flow for generating a multi-view interactive digital media representation.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MIDMR), which eliminates redundancy in the data, and presents a user with an interactive and immersive active viewing experience. According to various embodiments, active is described in the context of providing a user with the ability to control the viewpoint of the visual information displayed on a screen.

Furthermore, various embodiments disclosed herein also provide the dynamic modification and augmentation of MIDMRs. As will be discussed in greater detail below, various different types of inputs and combinations of such inputs may be received from one user or a multitude of users to create a dynamic content input. In various embodiments, the dynamic content input may be a physical input, such as a tilt, and such an input may be used to change or modify a presentation of an MIDMR as well as contents of such an MIDMR to implement changes in the presentation and functionality of the MIDMR dynamically and in real time. As will also be discussed in greater detail below, such dynamic changes and modifications may include operations such as presenting or portaling to another view or additional data associated with an object included in the MIDMR, accessing or calling another application, or even changing or modifying an object that is the focal point of the MIDMR.

As discussed above, an MIDMR is a multi-view interactive digital media representation. With reference to FIG. 1, shown is one example of an MIDMR acquisition system 100. In the present example embodiment, the MIDMR acquisition system 100 is depicted in a flow sequence that can be used to generate an MIDMR. As will be discussed in greater detail below, MIDMRs may be configured to implement various dynamic changes and dynamic content that increase and enhance the functionality of such MIDMRs.

According to various embodiments, the data used to generate an MIDMR can come from a variety of sources. In particular, data such as, but not limited to two-dimensional (2D) images 104 can be used to generate an MIDMR. These 2D images can include color image data streams such as multiple image sequences, video data, etc., or multiple images in any of various formats for images, depending on the application. As will be discussed in greater detail below, navigational inputs from an input device, such as a mobile device, may be used to select images to output in an MIDMR. For example, a user can tilt a mobile device or swipe a touch screen display to select the images to output in an MIDMR. As will be discussed in greater detail below, the navigational inputs change the apparent position of the object included in an MIDMR on the display. For example, the object can appear to rotate on the display in response to the navigational inputs.

According to some embodiments, implementations of the MIDMRs enable the elimination of the 3-D modeling steps, and user-selected objects from user generated 2-D images may be converted quickly to an MIDMR and then output to a display in real-time. In particular embodiments, during output, the user can control aspects of apparent motion of the object within the MIDMR. Because the object in the MIDMR can be generated from real images, such as images received from a user controlled camera, the object appears life-like when output. In a various traditional 3-D modeling approaches, because of the difficulties associated with generating an image quality 3-D model, this capability is not offered.

In addition to images, another source of data that can be used to generate an MIDMR includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate an MIDMR can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, an MIDMR can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of an MIDMR are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that an MIDMR can be generated without a user specified target in some applications.

In the present example embodiment, one or more enhancement algorithms can be applied at enhancement algorithm(s) block 116. In particular example embodiments, various algorithms can be employed during capture of MIDMR data, regardless of the type of capture mode employed. These algorithms can be used to enhance the user experience. For instance, automatic frame selection, stabilization, view interpolation, filters, and/or compression can be used during capture of MIDMR data. In some examples, these enhancement algorithms can be applied to image data after acquisition of the data. In other examples, these enhancement algorithms can be applied to image data during capture of MIDMR data.

According to particular example embodiments, automatic frame selection can be used to create a more enjoyable MIDMR. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for an MIDMR in a manner similar to that used for video. In particular, keyframes in an MIDMR can be stabilized for to produce improvements such as smoother transitions, improved/enhanced focus on the content, etc. However, unlike video, there are many additional sources of stabilization for an MIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor. Thus, according to various embodiments, the implementation of MIDMRs provide additional advantages over conventional approaches due to the ability to utilize IMU rotational compensation factors which may allow the use of imperfect capture arc trajectories.

In some examples, depth information, if available, can be used to provide stabilization for an MIDMR. Because points of interest in an MIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for MIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because an MIDMR is often focused on a particular object of interest, an MIDMR can be content-weighted so that the object of interest is maximally stabilized in some examples.

Another way to improve stabilization in an MIDMR includes direct selection of a region of a screen. For instance, if a user taps to focus on a region of a screen, then records a convex MIDMR, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of an MIDMR in some embodiments. In other embodiments, view interpolation can be applied during MIDMR generation.

In some examples, filters can also be used during capture or generation of an MIDMR to enhance the viewing experience. Just as many popular photo sharing services provide aesthetic filters that can be applied to static, two-dimensional images, aesthetic filters can similarly be applied to surround images. However, because an MIDMR representation is more expressive than a two-dimensional image, and three-dimensional information is available in an MIDMR, these filters can be extended to include effects that are ill-defined in two dimensional photos. For instance, in an MIDMR, motion blur can be added to the background (i.e. context) while the content remains crisp. In another example, a drop-shadow can be added to the object of interest in an MIDMR.

In various examples, compression can also be used as an enhancement algorithm 116. In particular, compression can be used to enhance user-experience by reducing data upload and download costs. Because MIDMRs use spatial information, far less data can be sent for an MIDMR than a typical video, while maintaining desired qualities of the MIDMR. Specifically, the IMU, keypoint tracks, and user input, combined with the view interpolation described above, can all reduce the amount of data that must be transferred to and from a device during upload or download of an MIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, an MIDMR 118 is generated after any enhancement algorithms are applied. In various examples, the MIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context), the ability to associate special feature descriptors with MIDMRs that allow the MIDMRs to be indexed with a high degree of efficiency and accuracy; and the ability of the user to interact and change the viewpoint of the MIDMR. In particular example embodiments, the characteristics described above can be incorporated natively in the MIDMR representation, and provide the capability for use in various applications. For instance, MIDMRs can be used to enhance various fields such as e-commerce, visual search, 3D printing, file sharing, user interaction, and entertainment.

Moreover, the implementation of MIDMRs may provide additional advantages over rendering an object from a full 3-D model. With a full 3-D model approach, the navigational inputs can be used to adjust the position of the 3-D model in 3-D model space. Then, the 3-D model can be re-rendered to a 2-D image each time its position changes in the 3-D model space in response to the navigational inputs. This 3-D model approach provides for more transitions because the movements of the object are not predetermined. However, the 3-D model approach is computationally expensive, especially as the complexity of the 3-D model increases. Further, it requires the generation of a 3-D model, which can be time consuming.

In some embodiments, implementations of MIDMRs don't require the generation of a 3-D model. In one example, the implementation of MIDMRs does not require a textured 3-D model of an object to be generated, determining of a position of the 3-D model of the object and its polygons in the 3-D space for each rotation, and, after the 3-D model of the object is positioned in the 3-D space, it doesn't have to be textured and then rendered to a 2-D image for output to a display. Thus, according to this example, the apparent rotation in an MIDMR is accomplished using 2-D images only and doesn't require a 3-D model of the object, such as 3-D model including a plurality of polygons and associated textures. In this way, various MIDMR approaches disclosed herein may represent apparent motions of an object in 3-D in a faster and more computational efficient manner because the elimination of these steps with a particular MIDMR approach reduces memory requirements and CPU requirements as compared to a traditional 3-D modeling approach. Furthermore, according to some embodiments, when an apparent motion of an object is output from an MIDMR, it appears as if the object motion is generated from an image quality 3-D textured model.

As will be discussed in greater detail below, such MIDMRs may also be configured to implement dynamic changes based on one or more dynamic inputs. For example, the MIDMR may be configured such that a particular dynamic input, such as a tilt or swipe, or a combination of dynamic inputs may cause a dynamic change that in the presentation and functionality of the MIDMR. Accordingly, such a change may be rendered and implemented dynamically and in real time. As will be discussed in greater detail below, such changes may include implementations of different views, modifications of the models underlying the MIDMR itself, as well as the calling and implementation of other data objects and/or applications.

According to various example embodiments, once an MIDMR 118 is generated, user feedback for acquisition 120 of additional image data can be provided. In particular, if an MIDMR is determined to need additional views to provide a more accurate model of the content or context, a user may be prompted to provide additional views. Once these additional views are received by the MIDMR acquisition system 100, these additional views can be processed by the system 100 and incorporated into the MIDMR.

With reference to FIG. 2, shown is an example of a process flow diagram for generating an MIDMR 200. In the present example, a plurality of images is obtained at 202. According to various embodiments, the plurality of images can include two-dimensional (2D) images or data streams. These 2D images can include location information that can be used to generate an MIDMR. In some embodiments, the plurality of images can include depth images 108, as also described above with regard to FIG. 1. The depth images can also include location information in various examples. Moreover, as discussed above and will be discussed in greater detail below, MIDMRs, such as MIDMR 200, may be configured to implement dynamic changes based on one or more received dynamic inputs.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, an MIDMR is generated from the content and context models at 208. The MIDMR can provide a multi-view interactive digital media representation. In various examples, the MIDMR can include a three-dimensional model of the content and a two-dimensional model of the context. According to various embodiments, depending on the mode of capture and the viewpoints of the images, the MIDMR model can include certain characteristics. For instance, some examples of different styles of MIDMRs include a locally concave MIDMR, a locally convex MIDMR, and a locally flat MIDMR. However, it should be noted that MIDMRs can include combinations of views and characteristics, depending on the application. Furthermore, as previously stated and as will be discussed in greater detail below, MIDMRs may be configured to implement dynamic changes based on one or more received dynamic inputs.

Figure 3:
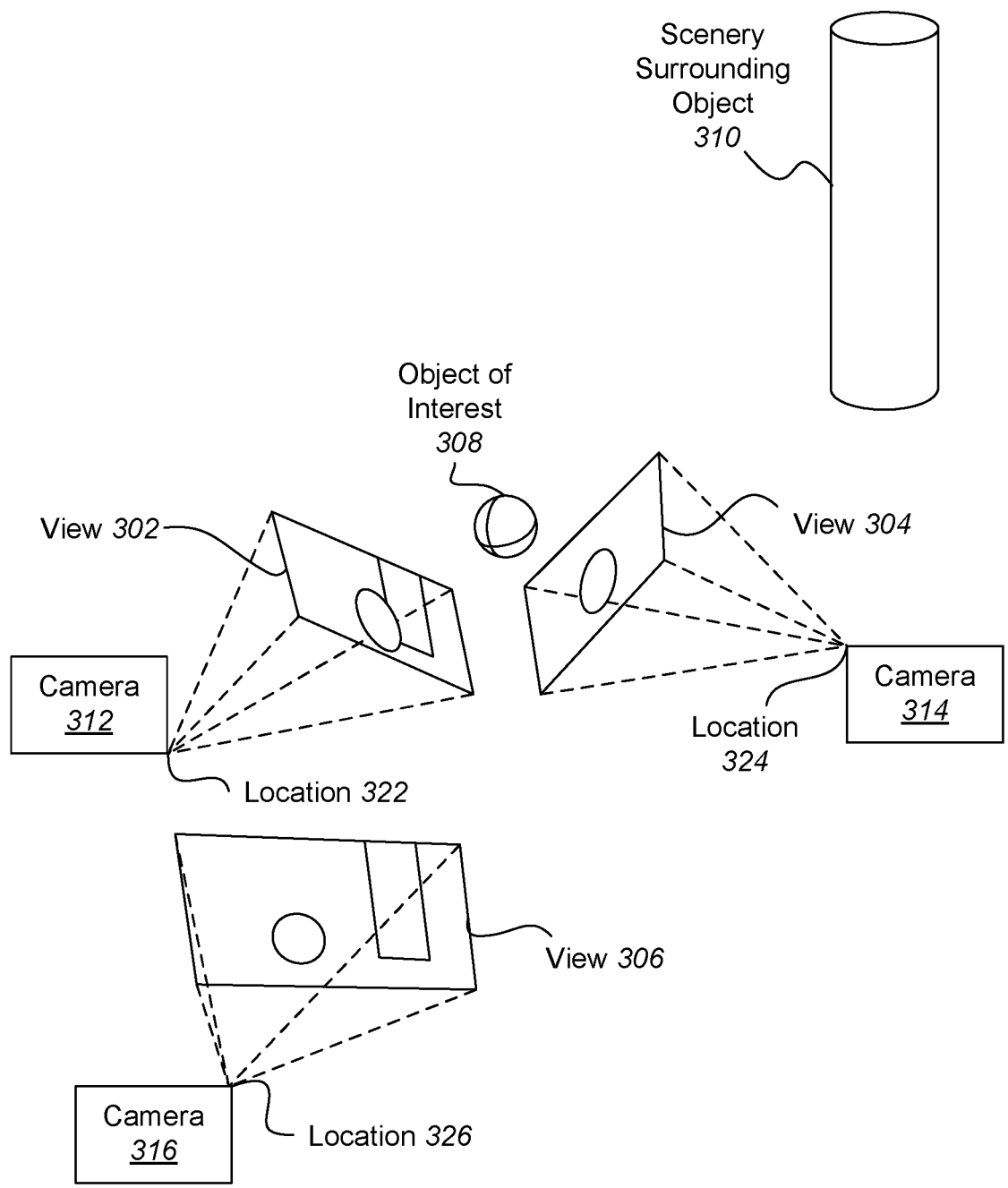
FIG. 3 illustrates one example of multiple camera views that can be fused into a three-dimensional (3D) model to create an immersive experience.

With reference to FIG. 3, shown is one example of multiple camera views that can be fused together into a three-dimensional (3D) model to create an immersive experience. According to various embodiments, multiple images can be captured from various viewpoints and fused together to provide an MIDMR. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce an MIDMR. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing an MIDMR.

FIG. 4 illustrates one example of separation of content and context in an MIDMR. According to various embodiments of the present invention, an MIDMR is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate an MIDMR.

According to various embodiments of the present disclosure, the digital visual data included in an MIDMR can be, semantically and/or practically, separated into content 404 and context 406. According to particular embodiments, content 404 can include the object(s), person(s), or scene(s)

of interest while the context 406 represents the remaining elements of the scene surrounding the content 404. In some examples, an MIDMR may represent the content 404 as three-dimensional data, and the context 406 as a two-dimensional panoramic background. In other examples, an MIDMR may represent both the content 404 and context 406 as two-dimensional panoramic scenes. In yet other examples, content 404 and context 406 may include three-dimensional components or aspects. In particular embodiments, the way that the MIDMR depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the MIDMR produced may have some characteristics that are similar to other types of digital media such as panoramas. However, according to various embodiments, MIDMRs include additional features that distinguish them from these existing types of digital media. For instance, an MIDMR can represent moving data. Additionally, an MIDMR is not limited to a specific cylindrical, spherical or translational movement. Various motions can be used to capture image data with a camera or other capture device. Furthermore, unlike a stitched panorama, an MIDMR can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in an MIDMR.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6E illustrate examples of various capture modes for MIDMRs. Although various motions can be used to capture an MIDMR and are not constrained to any particular type of motion, three general types of motion can be used to capture particular features or views described in conjunction MIDMRs. These three types of motion, respectively, can yield a locally concave MIDMR, a locally convex MIDMR, and a locally flat MIDMR. In some examples, an MIDMR can include various types of motions within the same MIDMR.

Figure 6A:
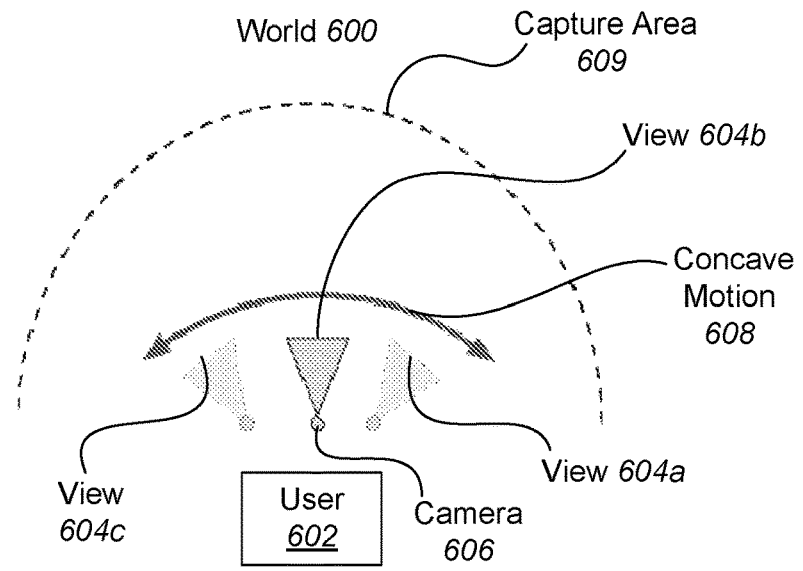
FIGS. 6A-6E illustrate examples of various capture modes for multi-view interactive digital media representations.

With reference to FIG. 6A, shown is an example of a back-facing, concave MIDMR being captured. According to various embodiments, a locally concave MIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
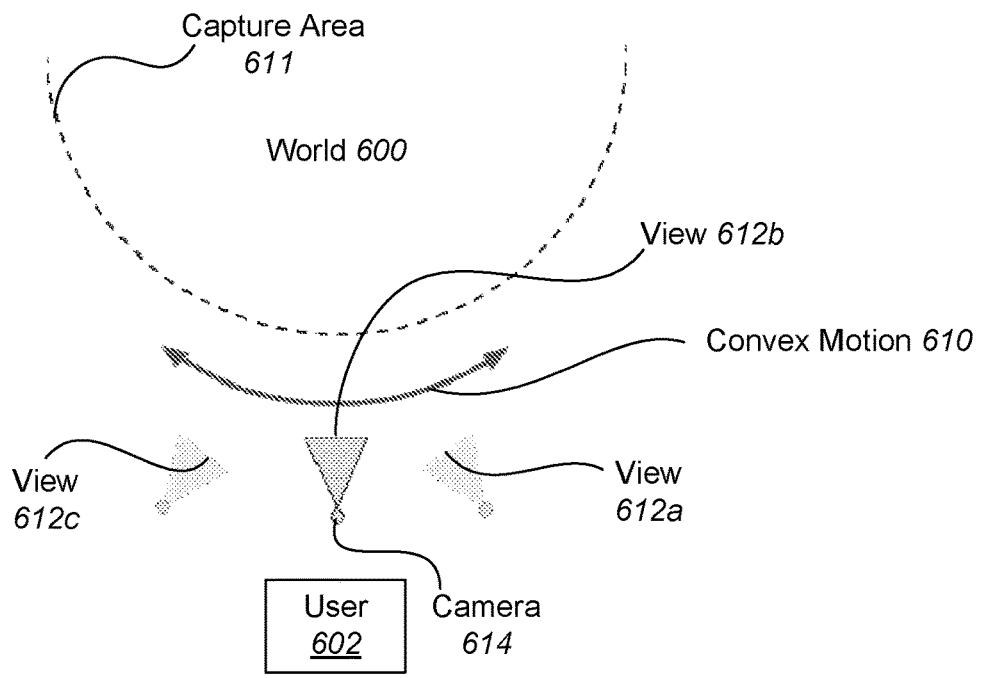

With reference to FIG. 6B, shown is an example of a back-facing, convex MIDMR being captured. According to various embodiments, a locally convex MIDMR is one in which viewing angles converge toward a single object of interest. In some examples, a locally convex MIDMR can provide the experience of orbiting about a point, such that a viewer can see multiple sides of the same object. This object, which may be an "object of interest," can be segmented from the MIDMR to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
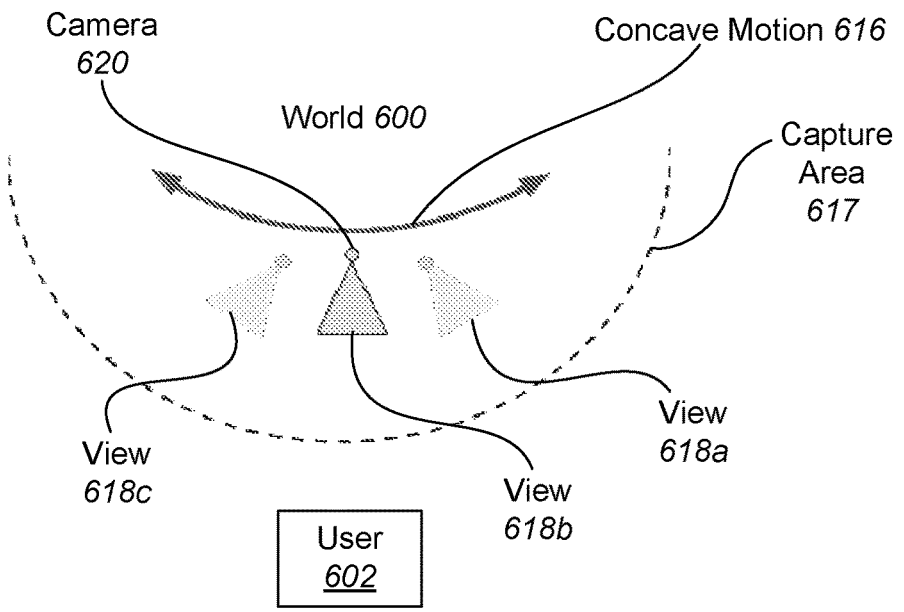

With reference to FIG. 6C, shown is an example of a front-facing, concave MIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
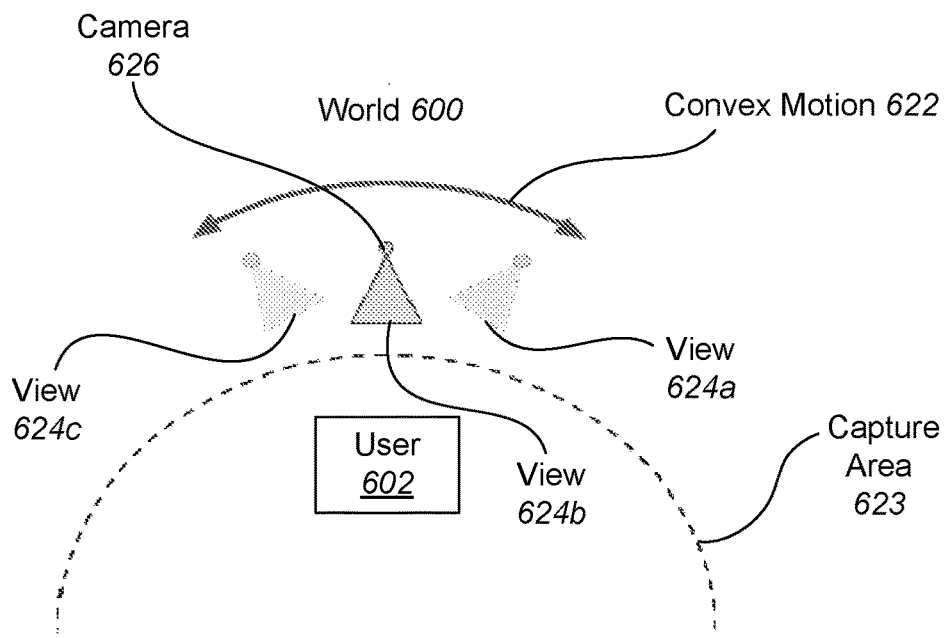

With reference to FIG. 6D, shown is an example of a front-facing, convex MIDMR being captured. In the present example embodiment, camera 626 is facing user 602. The camera follows a convex motion 622 such that the views 624a, 624b, and 624c converge towards the user 602. The capture area 617 follows a concave shape that surrounds the user 602.

Figure 6E:
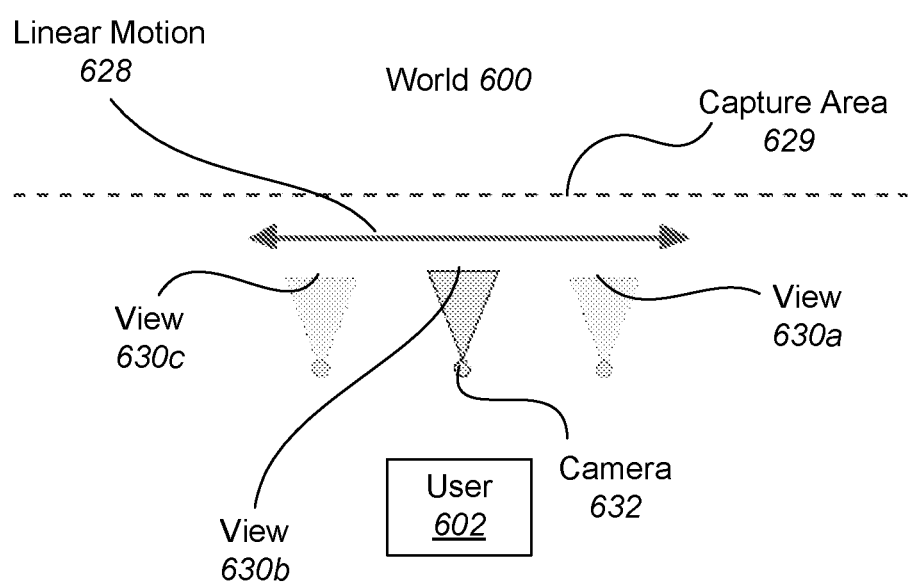

With reference to FIG. 6E, shown is an example of a back-facing, flat view being captured. In particular example embodiments, a locally flat MIDMR is one in which the rotation of the camera is small compared to its translation. In a locally flat MIDMR, the viewing angles remain roughly parallel, and the parallax effect dominates. In this type of MIDMR, there can also be an "object of interest", but its position does not remain fixed in the different views. Previous technologies also fail to recognize this type of viewing angle in the media-sharing landscape.

In the present example embodiment, camera 632 is facing away from user 602, and towards world 600. The camera follows a generally linear motion 628 such that the capture area 629 generally follows a line. The views 630a, 630b, and 630c have generally parallel lines of sight. An object viewed in multiple views can appear to have different or shifted background scenery in each view. In addition, a slightly different side of the object may be visible in different views. Using the parallax effect, information about the position and characteristics of the object can be generated in an MIDMR that provides more information than any one static image.

As described above, various modes can be used to capture images for an MIDMR. These modes, including locally concave, locally convex, and locally linear motions, can be used during capture of separate images or during continuous recording of a scene. Such recording can capture a series of images during a single session.

Figure 7:
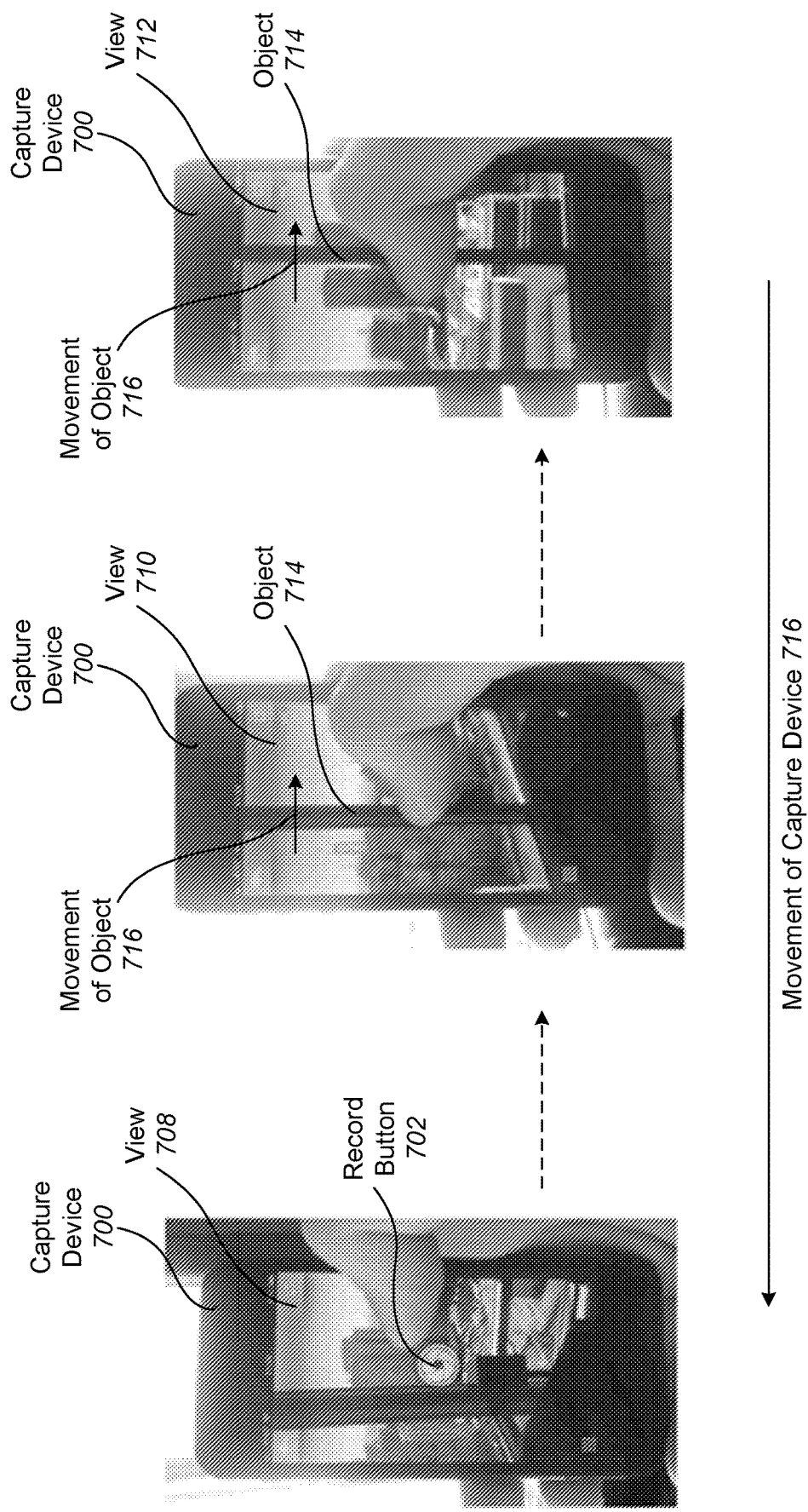
FIG. 7 illustrates one example of a process for recording data that can be used to generate a multi-view interactive digital media representation.

According to various embodiments of the present invention, an MIDMR can be generated from data acquired in numerous ways. FIG. 7 illustrates one example of process for recording data that can be used to generate an MIDMR. In this example, data is acquired by moving a camera through space. In particular, a user taps a record button 702 on a capture device 700 to begin recording. As movement of the capture device 716 follows a generally leftward direction, an object 714 moves in a generally rightward motion across the screen, as indicated by movement of object 716. Specifically, the user presses the record button 702 in view 708, and then moves the capture device leftward in view 710. As the capture device moves leftward, object 714 appears to move rightward between views 710 and 712. In some examples, when the user is finished recording, the record button 702 can be tapped again. In other examples, the user can tap and hold the record button during recording, and release to stop recording. In the present embodiment, the recording captures a series of images that can be used to generate an MIDMR.

Figure 8:
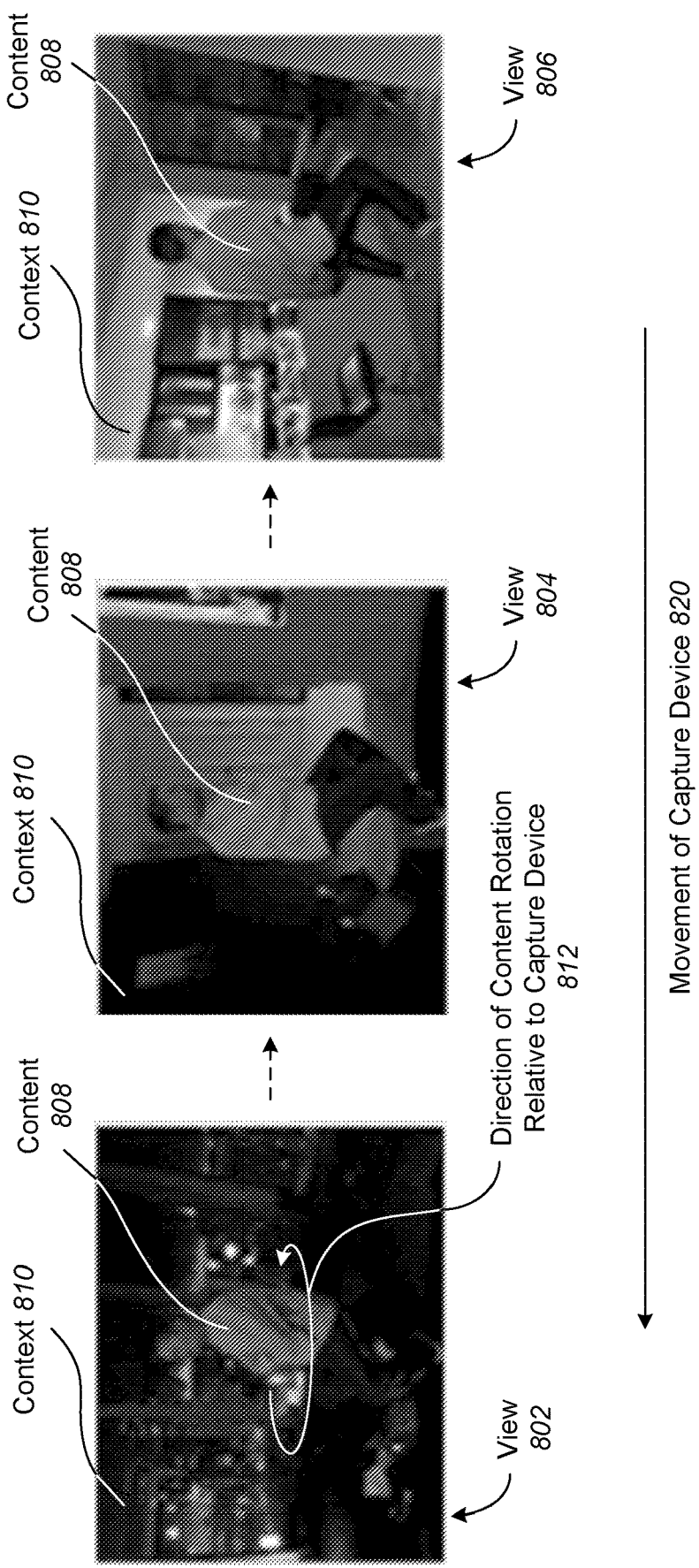
FIG. 8 illustrates an example of a multi-view interactive digital media representation in which three-dimensional content is blended with a two-dimensional panoramic context.

According to various embodiments, once a series of images is captured, these images can be used to generate an MIDMR. With reference to FIG. 8, shown is an example of an MIDMR in which three-dimensional content is blended with a two-dimensional panoramic context. In the present example embodiment, the movement of capture device 820 follows a locally convex motion, such that the capture device moves around the object of interest (i.e., a person sitting in a chair). The object of interest is delineated as the content 808, and the surrounding scenery (i.e., the room) is delineated as the context 810. In the present embodiment, as the movement of the capture device 820 moves leftwards around the content 808, the direction of content rotation relative to the capture device 812 is in a rightward, counterclockwise direction. Views 802, 804, and 806 show a progression of the rotation of the person sitting in a chair relative to the room.

Figure 9:
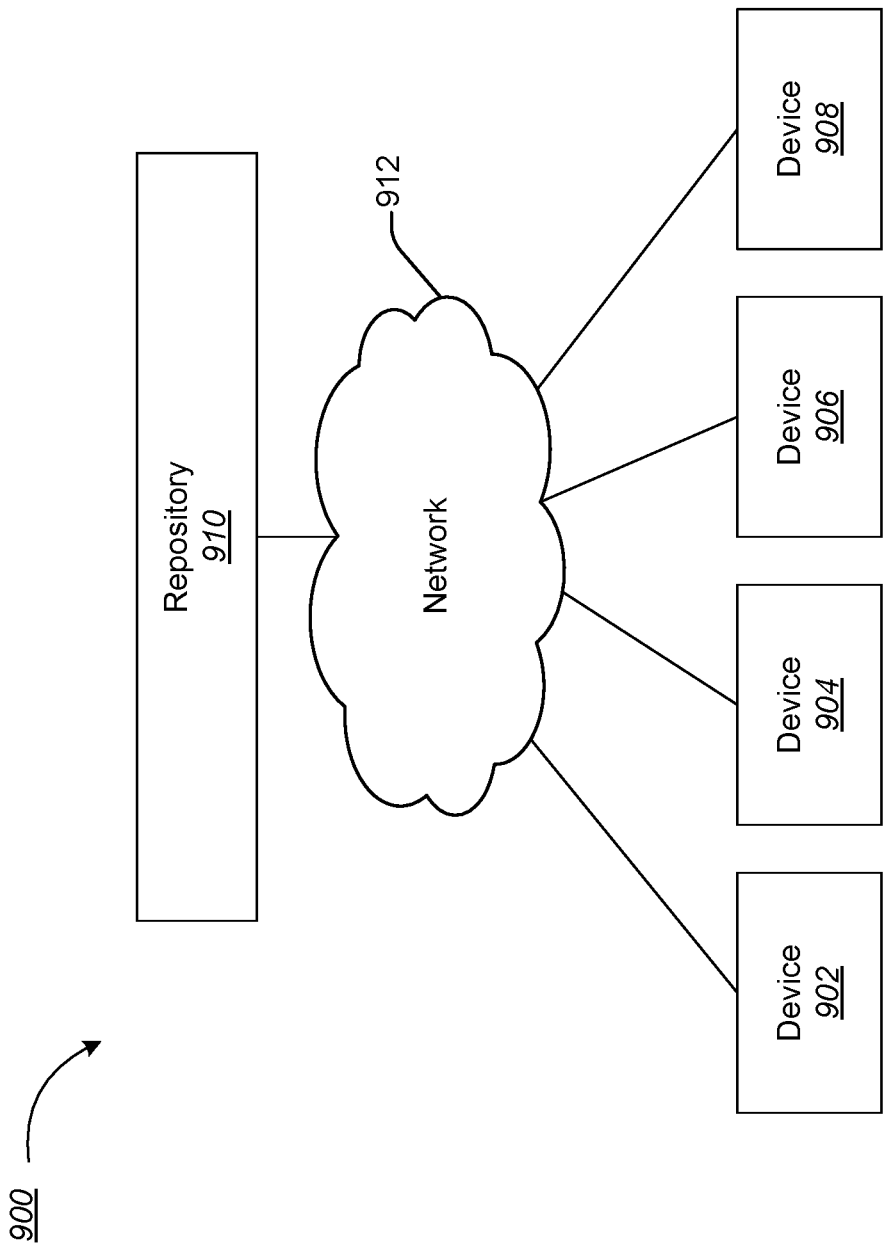
FIG. 9 illustrates an example of a system for implementing dynamic multi-view interactive digital media representations, configured in accordance with some embodiments.

With reference to FIG. 9, shown is an example of a system for implementing dynamic MIDMRs, configured in accordance with some embodiments. As will be discussed in greater detail below and as similarly discussed above, a system such as system 900, may also be configured to generate and store MIDMRs. Moreover, components of system 900 may be configured to receive and process inputs dynamically, and adjust and modify the contents and presentation and utilization of MIDMRs dynamically and in real time based on such inputs. As discussed above and as will be discussed in greater detail below, MIDMRs may be generated by one or more devices, and may be stored locally or centrally. Moreover, the presentation and utilization of such MIDMRs may be modified dynamically based on inputs received at one or more devices.

Accordingly, system 900 may include one or more devices, such as devices 902, 904, 906, and 908. As discussed above, such devices may be cameras, or may be other devices that include cameras, such as mobile communications devices, such as smartphones or tablets. In various embodiments, such devices may include one or more sensors, such as accelerometers, gyroscopes, and magnetometers. Moreover, such devices may be configured to generate and store MIDMRs as discussed above, as well as execute one or more applications that access, render, and interact with such MIDMRs as well.

System 900 may further include a central repository, such as repository 910, which may be coupled with devices 902, 904, 906, and 908 via a communications network, such as network 912. As will be discussed in greater detail below, repository 910 may also be referred to herein as a database system. In various embodiments, a database system such as repository 910 may be configured to store and manage MIDMRs. In various embodiments, repository 910 enables multiple devices to access, interact with, and modify the same MIDMRs. In this way, MIDMRs may be implemented such that their presentation and implementation is dynamically modified, and may be dynamically modified by multiple devices operated by multiple users.

Figure 10:
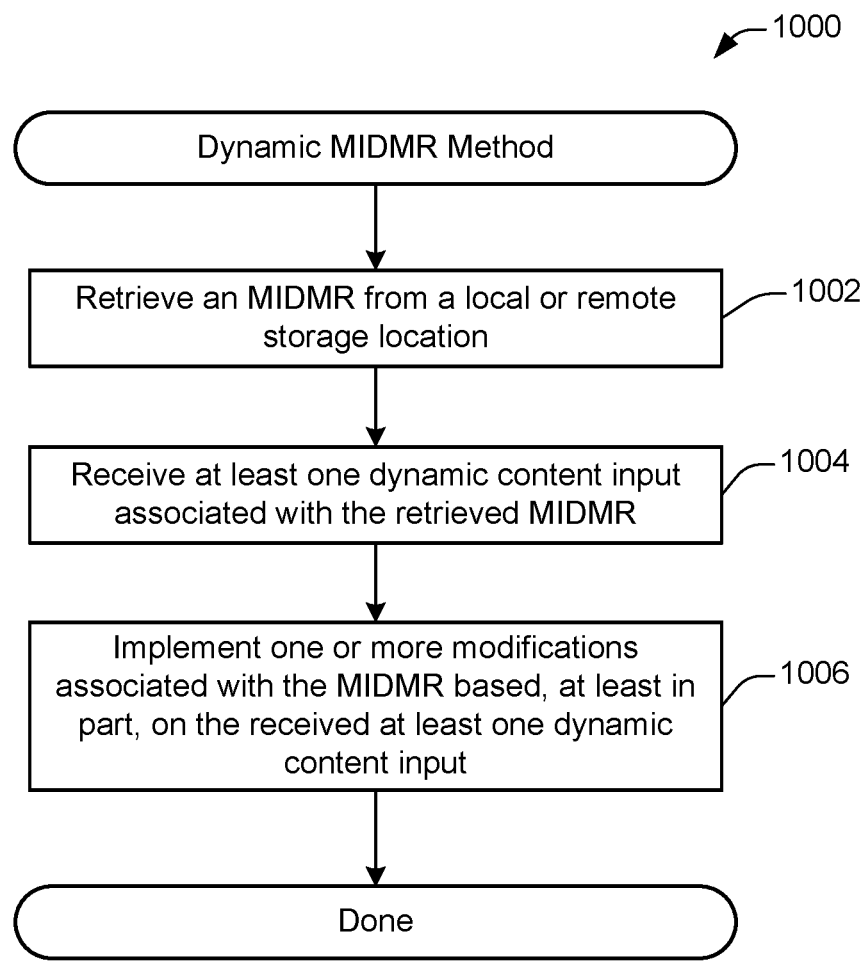
FIG. 10 illustrates a flow chart of an example of a method for implementing dynamic multi-view interactive digital media representations, implemented in accordance with some embodiments.

With reference to FIG. 10, shown is an example of a method for implementing dynamic MIDMRs, implemented in accordance with some embodiments. A dynamic content method, such as method 1000, may be implemented to receive and process inputs dynamically, and adjust and modify the contents and/or the presentation and utilization of MIDMRs dynamically and in real time based on such inputs. Accordingly, inputs, such as tilts of a device or other physical inputs, may be received dynamically and used to modify the contents and/or presentation of MIDMRs such that additional views may be displayed or portaled to, additional information may be displayed, or various information or views may be prevented from being displayed.

Method 1000 may commence with operation 1002 during which an MIDMR may be retrieved. As discussed above, such MIDMRs may be data structures that are generated by one or more devices, such as mobile communications devices. Moreover, such MIDMRs may be stored in storage locations that are local storage locations or remote storage locations. For example, such MIDMRs may be stored locally on such devices, or may be stored centrally at a central repository. Accordingly, the MIDMR may be retrieved from the local storage on the device, or may be retrieved from the central repository. In various embodiments, the MIDMR may be retrieved responsive to a request from one or more applications executing on the device, and/or responsive to one or more actions associated with such applications, as will be discussed in greater detail below.

Method 1000 may proceed to operation 1004 during which a dynamic content input may be received. As will be discussed in greater detail below, the dynamic content input, also referred to herein as an input, may be an input received from one or more components of a device, such as a sensor. For example, accelerometers included in the device may identify one or more motions, such as tilts, and such tilts may be identified and received as inputs associated with the MIDMR. As will also be discussed in greater detail below, in addition to inputs received from individual devices, such inputs may be received from multiple devices and aggregated to form combined inputs.

Method 1000 may proceed to operation 1006 during which the MIDMR may be modified based on the received input. In some embodiments, the MIDMR may be modified based on the input or a combination of inputs. As will be discussed in greater detail below, the modification may be a dynamic content modification that is responsive to a particular input, a specific combination on inputs, or even combinations of inputs received from different devices that may be associated with the same MIDMR. In various embodiments, the modification may enable a different view, such as a still view or different omnidirectional view. Moreover, the modification may enable the display of additional data such as additional tags as well as metadata associated with the MIDMR. In some embodiments, the modification may prevent access to some types or orientations of views of an object that may be included in the MIDMR. Accordingly, the input or combination of inputs received at the device or devices may modify and change the presentation of the MIDMR as well as the possible interactions between a user and the MIDMR.

Figure 11:
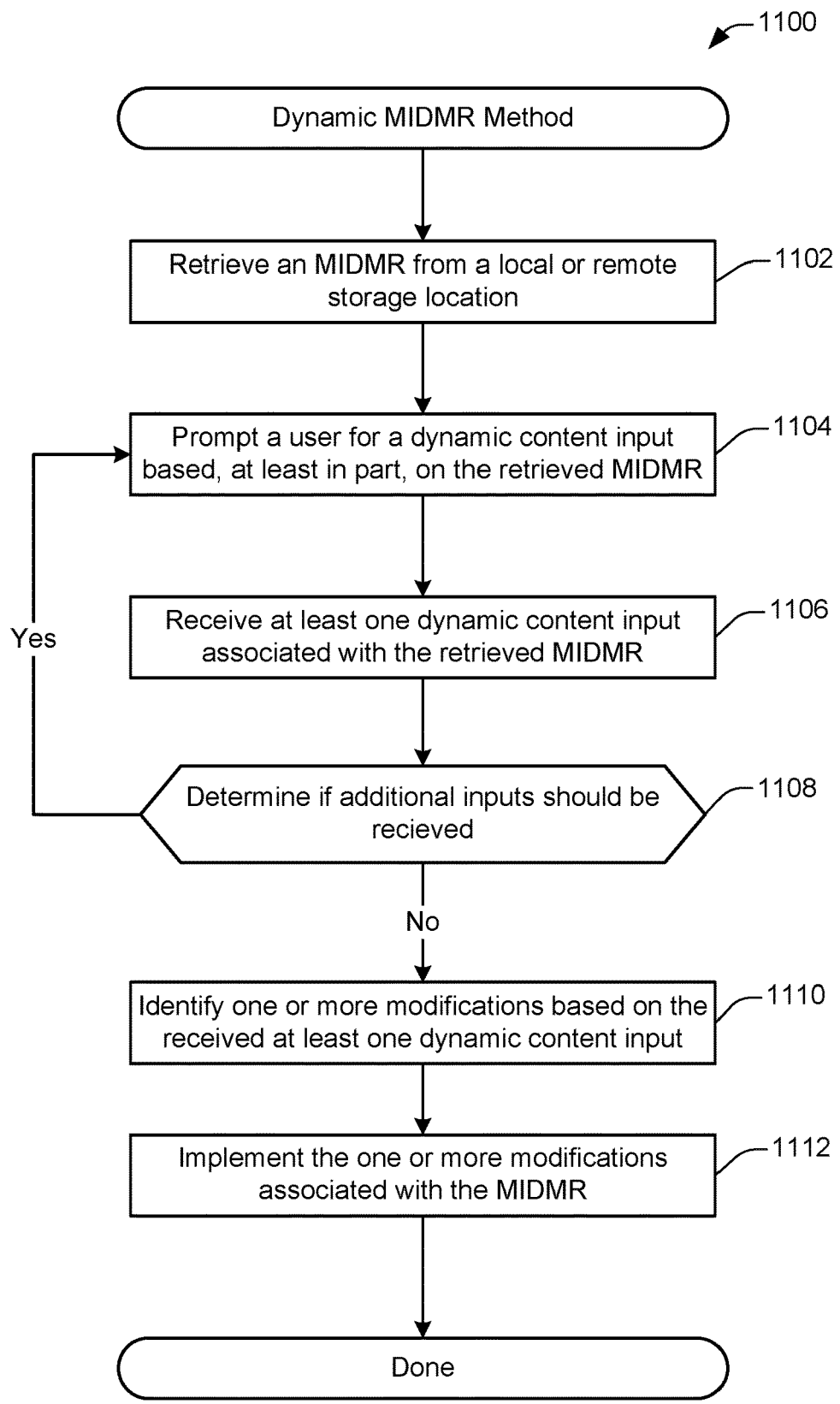
FIG. 11 illustrates a flow chart of another example of a method for implementing dynamic multi-view interactive digital media representations, implemented in accordance with some embodiments.

With reference to FIG. 11, shown is another example of a method for implementing dynamic MIDMRs, implemented in accordance with some embodiments. As discussed above, a method for implementing dynamic MIDMR content, such as method 1100, may enable a user of a device to dynamically implement changes to MIDMRs that facilitate the modification of the MIDMR, the presentation of additional MIDMRs, or even the presentation of different data objects and execution of different applications associated with an object represented within the MIDMR.

Method 1100 may commence with operation 1102 during which one or more MIDMRs may be retrieved. As similarly discussed above, MIDMRs may be generated by one or more devices, such as mobile communications devices, and such MIDMRs may be stored locally on such devices, or may be stored centrally at a central repository. Accordingly, the MIDMR may be retrieved from the local storage on the device, or may be retrieved from the central repository. As discussed above, an MIDMR can provide a multi-view interactive digital media representation. In various examples, the MIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects. Accordingly, an MIDMR may include a content model that may be three dimensional, as well as a context model which may be two-dimensional or three-dimensional, and such models may have been generated based on a fusion of previously taken images. As will be discussed in greater detail below, inputs received at a device during a dynamic MIDMR method, such as method 1100, may be used to modify the presentation and/or contents of such content and context models.

As also discussed above, the MIDMR may be retrieved responsive to a request from one or more applications executing on the device, and/or responsive to one or more actions associated with such applications. For example, a social media or social networking application may request a data object including the MIDMR during operation of the social networking application, and in response to an input provided by a user that may identify one or more actions such as viewing the MIDMR or sharing the MIDMR. In another example, a web browser may request the MIDMR for display or upload to a webpage.

Method 1100 may proceed to operation 1104 during which a user may be prompted for an input. In some embodiments, the prompt may be a message or may simply be the presentation of a view of an object, or a user interface element associated with an object that may be included in the content model of the MIDMR. For example, the prompt may highlight a portion of the object or present a flashing portion of the object. In another example, the prompt may display text of a message indicating that additional views or actions are available. It will be appreciated that operation 1104 is optional, and in various embodiments, is not performed. For example, embodiments disclosed herein do not include operation 1104, and not prompt is provided to the user.

Method 1100 may proceed to operation 1106 during which an input may be received. In various embodiments, the input may be received from a user that may be using the device that has requested and is displaying the MIDMR. For example, the user may be a user of a mobile communications device that is displaying the requested MIDMR. In various embodiments, the input may be an input identified by sensors included in the device such as accelerometers, gyroscopes, and/or magnetometers. For example, accelerometers included in the device may identify a tilt as well as a direction of a tilt based on measurements made during the process of the tilt. In some embodiments, a tilt or other motion may be identified when such measurements exceed a particular threshold(s) configured to characterize the occurrence of a tilt. Accordingly, the input may include the physical movement of the device and changes in the orientation of the device. In various embodiments, the input may also include various other inputs such as the pressing of buttons, or interactions with a capacitive touch screen of the device.

Method 1100 may proceed to operation 1108 during which it may be determined if additional inputs should be received. In various embodiments, such a determination may be made based on dynamic content operation data included in or associated with the MIDMR. In this way, the MIDMR may be configured to implement one or more dynamic changes in response to receiving a particular input, or combination of inputs. As will be discussed in greater detail below, such inputs or combinations of inputs may trigger modifications to the presentation of the MIDMR to the user as well as the user's interaction with the MIDMR. Thus, the MIDMR may be configured to map received inputs to particular modifications or operations. In various embodiments, the MIDMR may have been configured in such a way by a software developer, a commercial entity, or even the user when specifying a type of MIDMR or features of an MIDMR when the MIDMR was initially generated. Accordingly, it may be determined whether or not additional inputs should be gathered based on the dynamic content operation data included in or associated with the MIDMR. If it is determined that additional inputs should be received, method 1100 may return to operation 1104, or if operation 1104 is not performed, to operation 1106. If it is determined that no additional inputs should be received, method 1100 may proceed to operation 1110.

Accordingly, method 1100 may proceed to operation 1110 during which one or more modifications may be identified based on the received input. As discussed above, the MIDMR may be configured to implement one or more dynamic changes in response to receiving a particular input, or combination of inputs, and such dynamic changes may be identified based on dynamic content operation data. In some embodiments, the dynamic content operation data may be configured to map a particular input or combination of inputs to a particular dynamic content modification. Accordingly, the received inputs may be mapped to a change in the presentation or contents of the content model and/or context model included in the MIDMR. As will be discussed in greater detail below, such changes may be identified and implemented dynamically and in real time. Furthermore, such changes may include specific combinations of inputs that may have particular physical and temporal constraints.

For example, an input that includes a designated number of tilts within a designated amount of time may be used to identify one or more operations that present another view. The different view may be a different orientation of the MIDMR, may be a different MIDMR entirely, or may be a different still view or additional content associated with the object identified by the content model of the MIDMR retrieved at operation 1102. In this way the input provided be used to identify a presentation of a different still or MIDMR of the object identified by the content model of the MIDMR, or the presentation of additional information or images of the object. Moreover, the input may be used to identify a modification of the content model to modify or redefine the object identified by the content model. In a specific example, if the MIDMR includes an object that is a person, but another object behind the person, such as the person's dog, is not visible, the input may be used to identify one or more modifications to the content model to include or focus on the dog, and enhance visibility of the dog. In this way, the input may be used to identify modifications to the contents of the content model as well as the representation of the objects in the MIDMR. As discussed above, the tilts may be directional such that a designated number of tilts in a first direction triggers the presentation of a first additional view, while a designated number of tilts in a second direction triggers the presentation of a second additional view.

In another example, an input may be used to identify an operation that blocks a particular view or presentation of an object in an MIDMR. In this example, if a designated number of tilts in a particular direction have been received, one or more operations may be identified that restrict the views available to a user. In this way, a particular orientation or view of an object within an MIDMR may be restricted such that it may be locked or inaccessible once a certain number of tilts or views have occurred.

In yet another example, an input may be used to identify an operation that portals to the contents of an object shown in the MIDMR. In a specific example, the object may be an item, such as a box, and an input, which may be a tilt or swipe, may be mapped to or used to identify one or more operations that cause the display of an additional data object that includes the contents of the box. In this way, additional data or contextual data associated with objects included in the MIDMR may be identified and displayed dynamically and based on the received inputs. Moreover, in another example, such an input may be used to identify an application program interface (API) that calls another application and causes the execution of that application. In this way, the input may be used to dynamically identify and execute another application that may be associated with the object included in the MIDMR. Similarly, the operations identified based on the received input may also enable the review of tags, metadata, or other internal content associated with the object.

It will be appreciated that while the above examples describe a tilt or tilts, any combination of any number of inputs may be implemented. For example, different tilts in different directions may be combined. Moreover, additional inputs such as swipes on a capacitive touch screen or presses of buttons may also be used as any of the inputs described above. Further still, different combinations of different types of inputs, such as combinations of tilts and swipes may be implemented as well.

Method 1100 may proceed to operation 1112 during which the MIDMR may be modified. As discussed above, based on the input(s) received, one or more modifications may be identified. Accordingly, during operation 1112, the modification(s) identified during operation 1110 may be implemented. For example, during operation 1112, the rendering and presentation of the MIDMR may be modified to present another view, or may be modified to block a particular view. In another example, the contents of an object may be portaled to, or another application may be called and executed.

Figure 12:
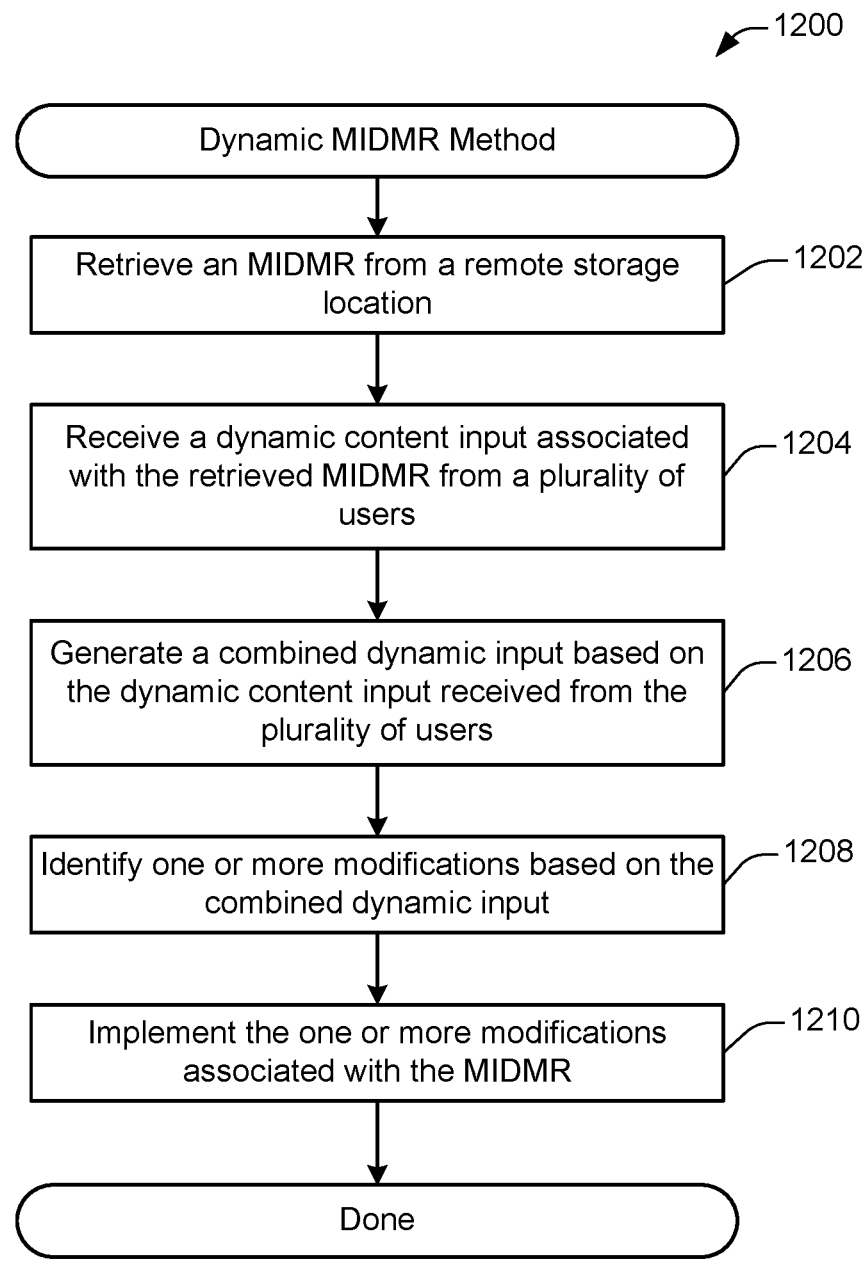
FIG. 12 illustrates a flow chart of yet another example of a method for implementing dynamic multi-view interactive digital media representations, implemented in accordance with some embodiments.

With reference to FIG. 12, shown is yet another example of a method for implementing dynamic MIDMRs, implemented in accordance with some embodiments. As will be discussed in greater detail below, a method for implementing dynamic MIDMR content, such as method 1200, may enable multiple users of devices to dynamically implement changes to MIDMRs that facilitate the modification of the MIDMR, the presentation of additional MIDMRs, or even the presentation of different data objects and execution of different applications associated with an object represented within the MIDMR.

Method 1200 may commence with operation 1202 during which an MIDMR may be retrieved. In various embodiments, the MIDMR may be stored in a remote location, such as a database system or repository, and may be accessible by several users. As similarly discussed above, an MIDMR may be generated by one or more devices, such as mobile communications devices, and such MIDMRs may be stored locally on such devices, and may be stored centrally at a central repository. Accordingly, the stored in a network accessible database storage system that may be accessible my multiple users and multiple devices. As also discussed above, the MIDMR may be retrieved responsive to a request from one or more applications executing on the devices, and/or responsive to one or more actions associated with such applications. For example, a social media or social networking application may request a data object including the MIDMR during operation of the social networking application, and in response to an input provided by a user that may identify one or more actions such as viewing the MIDMR or sharing the MIDMR. In another example, a web browser may request the MIDMR for display or upload to a webpage.

Method 1200 may proceed to operation 1204 during which one or more inputs may be received from several users. Accordingly, multiple inputs may be received from users that are using devices that have requested and are displaying the MIDMR. In this way, multiple inputs may be aggregated from multiple users for a particular MIDMR. As similarly discussed above, the input may be an input identified by sensors included in the devices such as accelerometers, gyroscopes, and/or magnetometers. For example, accelerometers included in the devices may identify a tilt as well as a direction of a tilt based on measurements made during the process of the tilt. In various embodiments, the inputs may also include various other inputs such as the pressing of buttons, or interactions with a capacitive touch screen of the device.

Method 1200 may proceed to operation 1206 during which a combined dynamic input may be generated based on the one or more inputs. Accordingly, a system component, such as a repository, may be configured to store inputs received for a particular MIDMR. As discussed above, such inputs may be received at several different devices operated by different users that may be distributed over a social networking platform, and the devices may communicate the inputs to the repository via a communications network. In various embodiments, the repository may be configured to combine the received inputs to generate a combined dynamic input. For example, the repository may identify a total number of tilts received in a particular direction. Furthermore, the repository may identify a combination of a particular number of swipes and a particular number of button presses. The repository may also identify a total number of view accesses or other operations associated with an MIDMR. In this way, the repository may be configured to monitor several inputs received at several devices, and generate a combined dynamic input based on the several inputs. As will be discussed in greater detail below, the combined dynamic input may be used to identify and implement modifications to the MIDMR and/or its presentation and functionality.

Method 1200 may proceed to operation 1208 during which one or more modifications may be identified based on the combined dynamic input. As discussed above, the MIDMR may be configured to implement one or more dynamic changes in response to receiving a particular input, or combination of inputs, and such dynamic changes may be identified based on dynamic content operation data associated with an MIDMR. As also discussed above, the dynamic content operation data may be configured to map a particular input or combination of inputs to a particular dynamic content modification. Accordingly, the combined dynamic input may be mapped to a change in the presentation or contents of the content model and/or context model included in the MIDMR, and such changes may be identified and implemented dynamically and in real time. As also discussed above, such changes may include specific combinations of inputs that may have particular physical and temporal constraints.

Method 1200 may proceed to operation 1210 during which at least one MIDMR may be modified. As discussed above, based on the input(s) received and the generated combined dynamic input, one or more modifications may be identified. Accordingly, during operation 1210, the modification(s) identified during operation 1208 may be implemented. For example, during operation 1210, the rendering and presentation of the MIDMR may be modified to present another view, or may be modified to block a particular view. In another example, the contents of an object may be portaled to, or another application may be called and executed. In various embodiments, the modification may be implemented at the MIDMR stored in the repository or database system. Moreover, according to some embodiments, the modification may be implemented across all instances of the MIDMR. Accordingly, once the combined inputs have triggered a modification, the modification may be implemented dynamically across all instances of the MIDMR on the devices.

With reference to FIG. 13, shown is a particular example of a computer system that can be used to implement particular examples of the present invention. For instance, the computer system 1300 can be used to provide MIDMRs according to various embodiments described above. According to particular example embodiments, a system 1300 suitable for implementing particular embodiments of the present invention includes a processor 1301, a memory 1303, an interface 1311, and a bus 1315 (e.g., a PCI bus). The interface 1311 may be a communications interface that may include separate input and output interfaces, or may be a unified interface supporting both operations. When acting under the control of appropriate software or firmware, the processor 1301 is responsible for such tasks such as optimization. Various specially configured devices can also be used in place of a processor 1301 or in addition to processor 1301. The complete implementation can also be done in custom hardware. The interface 1311 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1300 uses memory 1303 to store data and program instructions, such as computer code, and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine or computer readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
retrieving, using a processor, a multi-view interactive digital media representation (MIDMR) of an object from a storage location, the MIDMR including a plurality of images, each of the plurality of images including the object from a different camera view such that when the MIDMR is output to a display device, the object appears to undergo a 3-D rotation by scrolling through a sequence of only 2D images when interacted with by a user of the display device, the 3-D rotation of the object being generated without a 3-D polygon model of the object, the MIDMR comprising a content model and a context model, the content model characterizing the object, and the context model characterizing scenery surrounding the object, wherein the content model and the context model are generated based on the plurality of images;
receiving, using the processor, at least one dynamic content input associated with the retrieved MIDMR, the dynamic content input being received while a user is interacting with the MIDMR; and
implementing, using the processor, one or more modifications associated with the MIDMR based, at least in part, on the received at least one dynamic content input, the one or more modifications modifying a presentation and functionality of the MIDMR.

2. The method of claim 1, wherein the dynamic content input is detected by one or more sensors of a mobile communications device.

3. The method of claim 2, wherein the dynamic content input is a tilt detected and identified by at least one of an accelerometer or gyroscope of the mobile communications device.

4. The method of claim 1 further comprising:
identifying, using the processor, the one or more modifications based on the received at least one dynamic content input and dynamic content operation data.

5. The method of claim 4, wherein the dynamic content operation data characterizes a mapping that identifies at least one dynamic content modification based on at least one dynamic content input.

6. The method of claim 1, wherein the one or more modifications comprises modifying the content model included in the MIDMR.

7. The method of claim 1, wherein the one or more modifications comprises calling an application associated with the object.

8. The method of claim 1, wherein the one or more modifications comprises blocking a view of the object.

9. The method of claim 1, wherein the content model and the context model are generated by fusing the plurality of images.

10. The method of claim 9, wherein the content model is three dimensional, and wherein the context model is two dimensional.

11. A system comprising:
a communications interface configured to be coupled with a communications network; and
a processor configured to:
retrieve a MIDMR of an object from a storage location, the MIDMR including a plurality of images, each of the plurality of images including the object from a different camera view such that when the MIDMR is output to a display device, the object appears to undergo a 3-D rotation when interacted with by a user of the display device, the 3-D rotation of the object by scrolling through a sequence of only 2D images when being generated without a 3-D polygon model of the object, the MIDMR comprising a content model and a context model, the content model characterizing an object, and the context model characterizing scenery surrounding the object, wherein the content model and the context model are generated based on the plurality of images;
receive at least one dynamic content input associated with the retrieved MIDMR, the dynamic content input being received while a user is interacting with the MIDMR; and
implement one or more modifications associated with the MIDMR based, at least in part, on the received at least one dynamic content input, the one or more modifications modifying a presentation and functionality of the MIDMR.

12. The system of claim 11, wherein the processor is further configured to:
identify the one or more modifications based on the received at least one dynamic content input and dynamic content operation data, wherein the dynamic content operation data characterizes a mapping that identifies at least one dynamic content modification based on at least one dynamic content input.

13. The system of claim 11, wherein the one or more modifications comprises modifying the content model included in the MIDMR.

14. The system of claim 11, wherein the one or more modifications comprises calling an application associated with the object.

15. The system of claim 11, wherein the content model and the context model are generated by fusing the plurality of images, and wherein the content model is three dimensional, and wherein the context model is two dimensional.

16. A non-transitory computer readable medium comprising:
computer code for retrieving a MIDMR of an object from a storage location, the MIDMR including a plurality of images, each of the plurality of images including the object from a different camera view such that when the MIDMR is output to a display device, the object appears to undergo a 3-D rotation by scrolling through a sequence of only 2D images when interacted with by a user of the display device, the 3-D rotation of the object being generated without a 3-D polygon model of the object, the MIDMR comprising a content model and a context model, the content model characterizing an object, and the context model characterizing scenery surrounding the object, wherein the content model and the context model are generated based on the plurality of images;
computer code for receiving at least one dynamic content input associated with the retrieved MIDMR, the dynamic content input being received while a user is interacting with the MIDMR; and
computer code for implementing one or more modifications associated with the MIDMR based, at least in part, on the received at least one dynamic content input, the one or more modifications modifying a presentation and functionality of the MIDMR.

17. The non-transitory computer readable medium of claim 16, further comprising: computer code for identifying the one or more modifications based on the received at least one dynamic content input and dynamic content operation data, wherein the dynamic content operation data characterizes a mapping that identifies at least one dynamic content modification based on at least one dynamic content input.

18. The non-transitory computer readable medium of claim 16, wherein the one or more modifications comprises modifying the content model included in the MIDMR.

19. The non-transitory computer readable medium of claim 16, wherein the one or more modifications comprises calling an application associated with the object.

20. The non-transitory computer readable medium of claim 16, wherein the content model and the context model are generated by fusing the plurality of images, and wherein the content model is three dimensional, and wherein the context model is two dimensional.

* * * * *